US006957399B2

(12) United States Patent
Emberling et al.

(10) Patent No.: US 6,957,399 B2
(45) Date of Patent: Oct. 18, 2005

(54) CONTROLLING THE PROPAGATION OF A DIGITAL SIGNAL BY MEANS OF VARIABLE I/O DELAY COMPENSATION USING DELAY-TRACKING

(75) Inventors: Brian D. Emberling, San Mateo, CA (US); Anthony S. Ramirez, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 108 days.

(21) Appl. No.: 10/317,740

(22) Filed: Dec. 12, 2002

(65) Prior Publication Data

US 2004/0117742 A1 Jun. 17, 2004

(51) Int. Cl.[7] ............................................. G06F 17/50
(52) U.S. Cl. .............................................. 716/1; 716/6
(58) Field of Search .................. 716/1, 6; 365/193–194; 711/167, 158, 170

(56) References Cited

U.S. PATENT DOCUMENTS

| | | | | | |
|---|---|---|---|---|---|
| 5,952,843 | A | * | 9/1999 | Vinh | 324/761 |
| 6,456,544 | B1 | * | 9/2002 | Zumkehr | 365/193 |
| 6,629,225 | B2 | * | 9/2003 | Zumkehr | 711/167 |
| 6,646,929 | B1 | * | 11/2003 | Moss et al. | 365/194 |
| 2003/0141893 | A1 | * | 7/2003 | Gonzalez | 326/26 |
| 2004/0107324 | A1 | * | 6/2004 | Nystuen | 711/158 |

* cited by examiner

*Primary Examiner*—Vuthe Siek
*Assistant Examiner*—Paul Dinh
(74) *Attorney, Agent, or Firm*—Meyertons Hood Kivlin Kowert & Goetzel, P.C.; Jeffrey C. Hood; Mark K. Brightwell (57) ABSTRACT

The propagation of a feedback signal, such as a DQS signal generated in response to a read request in a Double Data Rate (DDR) memory system, into a digital host system, such as an ASIC, is controlled by using delay tracking to compensate for variable I/O delay. The memory system includes a controller and an interface, both on the ASIC, and memory units coupled to the controller through the interface, all configured on a printed circuit board (PCB). The interface uses the read request signal, sent by the controller to initiate read operations, to generate a read-enable signal, which is transmitted to a trace on the PCB one-half cycle of the system clock before DQS is expected to reach the interface. The trace tracks the total delay encountered by the system clock and DQS between the interface unit and memory units, and is routed back to the interface unit, where read-enable is used to generate an enable signal that allows DQS to propagate into the ASIC only when DQS is a valid digital signal.

32 Claims, 7 Drawing Sheets

CONTROLLING THE PROPAGATION OF A DIGITAL SIGNAL BY MEANS OF VARIABLE I/O DELAY COMPENSATION USING DELAY-TRACKING

BACKGROUND OF THE INVENTION

1. Field of the Invention

This invention relates generally to the field of digital interface design and, more particularly, to a system for controlling and timing the propagation of a digital signal.

2. Description of the Related Art

Figure 1:
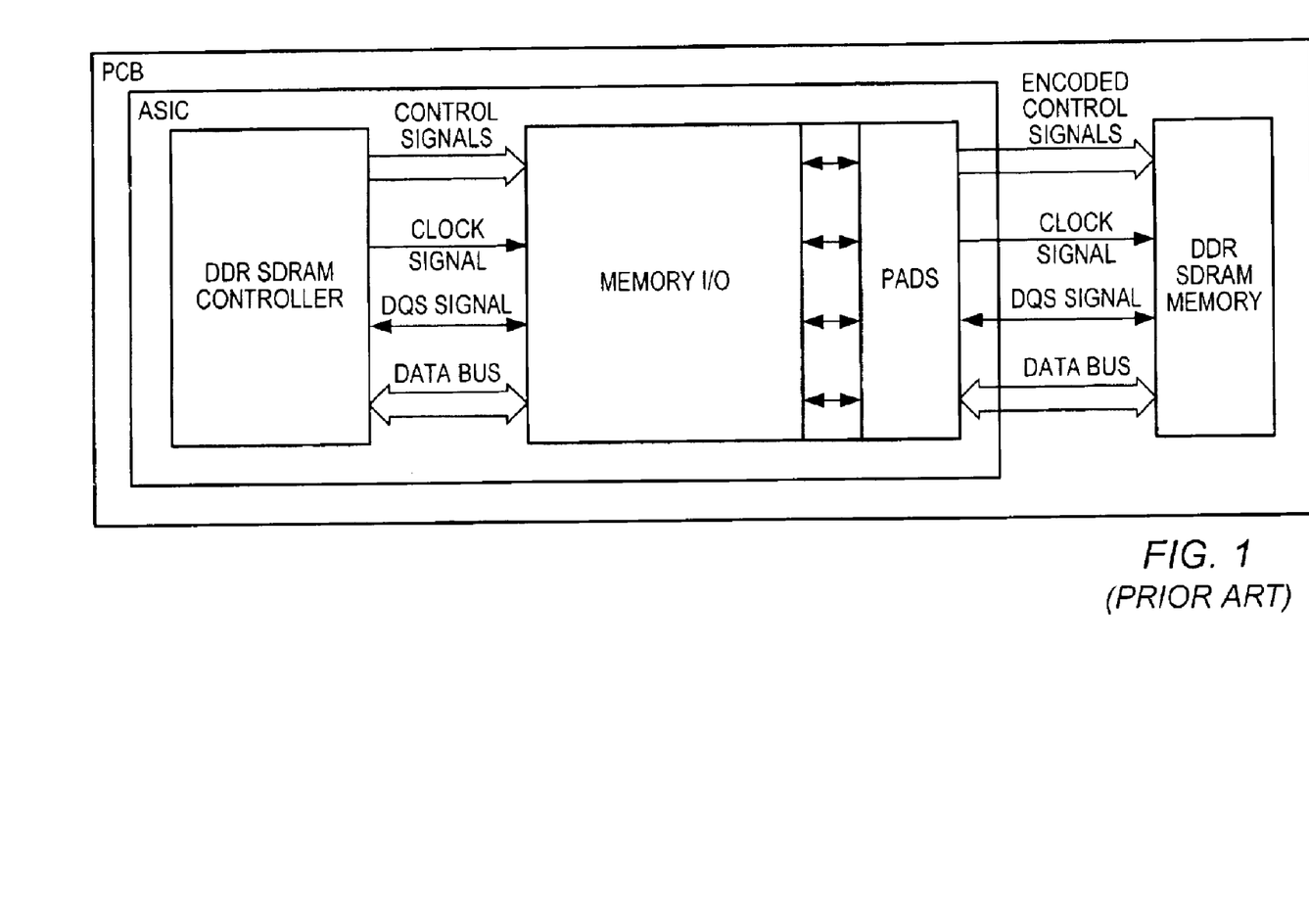
FIG. 1 illustrates a DDR SDRAM system configured on a printed circuit board in accordance with prior art.

The design of interfaces plays a significant role in the implementation of many digital systems. One example of a digital system is a Double Data Rate Synchronous Dynamic Random Access Memory (DDR SDRAM) system. FIG. 1 illustrates a common implementation of a DDR SDRAM system configured on a printed circuit board and comprising a DDR SDRAM Controller coupled to a DDR SDRAM unit through an interface unit (Memory I/O), wherein the Memory I/O is coupled to the DDR SDRAM unit through a set of pad circuits. In a DDR SDRAM, read-data is accompanied by a corresponding trigger signal, commonly referred to as a DQS signal. The DQS signal is commonly used by a host system, which may include an Application Specific Integrated Circuit (ASIC) coupled to the DDR SDRAM through an interface unit such as the Memory I/O, to sample and latch the read-data. The DQS signal does not always assume a distinctly defined low state or high state, considered valid states by the ASIC, during operations that are affected by the DQS signal, but frequently assumes a high impedance state, or stays at a mid-supply level, considered invalid states by the ASIC during the aforementioned operations. The ASIC uses the DQS signal to capture the read-data. The ASIC also typically needs to ascertain when the DQS signal resides in a valid state.

In current low-speed designs the ASIC may use internal timers to determine when the DQS signal is valid. Variations in delay due to process, voltage and temperature make this method very difficult to use for high-speed designs. Current solutions for high-speed systems focus on the design of special pad cells that are used in coupling the Interface unit to the DDR SDRAM. These special pad cells contain digital and analog (mixed-signal) circuit elements used in preventing the DQS signal from propagating inside the ASIC when the DQS signal resides in an invalid state. Such pad cells may require extensive design times and often result in larger than desired cell areas. Most of the time they are also slower than standard pad cells, thus degrading the overall performance of the ASIC in such instances. Therefore, there exists a need for a system and method for controlling the propagation of a signal such as the DQS signal, and like signals, which provide a simple and inexpensive solution while tracking all delay variations that the circuit experiences during operation, without requiring the design of special pad cells.

SUMMARY OF THE INVENTION

In one set of embodiments the invention comprises a system and method that provides an improved digital interface for controlling and timing the propagation of digital signals. In one embodiment, the system comprises a printed circuit board. A memory controller, a memory unit, and an interface unit may be configured on the printed circuit board. The memory controller may be coupled to the memory unit through the interface unit. In one embodiment, the interface unit is embedded on the same integrated circuit as the memory controller.

The interface unit may be configured to receive an input clock signal and a read signal from the memory controller and a trigger signal from the memory unit. The interface unit may further be configured to generate an enable signal based on the read signal and to conditionally propagate the trigger signal based on the enable signal. In one embodiment, the interface unit is further configured to provide an output clock signal to the memory unit based on the input clock signal. The output clock signal may be routed from the interface unit to the memory unit through a first trace route on the printed circuit board.

In one embodiment the memory unit is configured to receive an encoded version of the read signal and to generate the trigger signal in response to the encoded version of the read signal. The trigger signal may be routed from the memory unit to the interface unit through a second trace route. The interface unit may further be configured to generate the enable signal by performing one or more of the following:

(a) delaying the read signal by a predetermined latency;
(b) sending the delayed read signal through an external pathway;
(c) receiving the delayed read signal from the external pathway; and
(d) operating on the received delayed read signal to obtain the enable signal.

In one embodiment the external pathway is on the printed circuit board. The delay of the external pathway matches the delay incurred between the interface unit sending an output clock signal pulse and the interface unit receiving a first trigger signal pulse prior to the interface unit sending a next output clock signal pulse.

BRIEF DESCRIPTION OF THE DRAWINGS

The foregoing, as well as other objects, features, and advantages of this invention may be more completely understood by reference to the following detailed description when read together with the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

As used herein, a "trigger" signal is defined as a signal that is used to initiate an event or a sequence of events in a digital system. A trigger signal is said to be in a "triggering state" at a time when it initiates a desired event, or sequence of events. A periodic trigger signal may commonly be referred to as a "clock". In a "synchronous" digital system, generally a clock, commonly referred to as a "system clock", may be used for initiating most events, or sequences of events. An example of a triggering state may be a rising edge of a clock in a synchronous digital system. When an event, or a sequence of events, is said to be initiated "in response to" receiving a stimulus signal, it may be implied that the event, or the sequence of events, is initiated as a result of a combination of a trigger signal, used in triggering the event or sequence of events, being in a triggering state at a time when the stimulus signal is asserted. In one set of embodiments, the sending of a pulse through an output port may indicate a point in time at which a leading edge of the pulse occurs at the output port, and the receiving of a pulse through an input port may indicate a point in time at which a leading edge of the pulse occurs at the input port.

A set of flip-flops is said to be connected in a series when an output of a first flip-flop of the series is coupled to an input of a second flip-flop of the series, and an output of the second flip-flop of the series is coupled to an input of a third flip-flip flop of the series, and so forth until a last flip-flop of the series is reached. Any such series may be comprised of at least one flip-flop. A flip-flop may have a "preset" or "set" input which, when activated, presets an output of the flip-flop to a logic high level. Furthermore, a flip-flop may have a "reset" input which, when activated, resets an output of the flip-flop to a logic low level.

Figure 2:
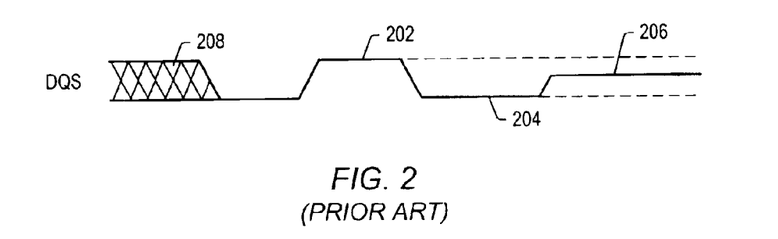
FIG. 2 illustrates a behavior of a DQS signal generated by a DDR SDRAM unit in accordance with prior art.

When discussing signals, a "mid-supply level" may refer to a state that represents a level nominally equidistant from a logic high level and logic low level, as illustrated in FIG. 2. A mid-supply level 206 may be set at a halfway distance between logic high 202 and logic low 204. When a signal is said to be residing in a "high impedance state" its value may be indeterminate, and thus unpredictable. A high impedance state 208 is also shown in FIG. 2. In some embodiments, "encoding" a single signal may mean the generation of a set of one or more signals for the purpose of representing the signal to be encoded, and where the set of signals may be propagated in lieu of the single signal to be encoded. A signal is said to be "qualified" when it meets the validity requirements as set forth by a host system. A host system may be, or may include an integrated circuit such as an ASIC. A signal that may assume a mid-supply level 206 or a high impedance state 208 in a digital host system during operations that are affected by the signal is generally considered not to meet the validity requirements of the digital host system. If a trigger signal routed to a digital host system exhibits the behavior illustrated in FIG. 2 during operations affected by the trigger signal, the trigger signal may be considered as one not meeting the validity requirements set forth by the digital host system. A given timing relationship between signals may be deemed "substantially invariant" with respect to a nominal timing relationship between the signals, insofar as a behavior (pertaining to a system using the signals) implied or predicted by the given timing relationship does not deviate from a behavior implied or predicted by the nominal timing relationship.

The term "bus" is used to refer to a plurality of signals or conductors that may be used to transfer one or more of various types of information, such as data, addresses, control, or status. "Burst length" is used to refer to a number that indicates how many consecutive data bus transfers may be performed in response to a single bus transfer request sent by a host system. For example, if a burst length is four and a memory read operation is performed, there may be four consecutive sets of data transferred on the data bus in response to a single read signal pulse sent by a host system. The size of a set of data for a single transfer over a data bus is typically commensurate with the size of the data bus. Common burst lengths for a DDR SDRAM may include the values of two, four or eight.

Figure 3:
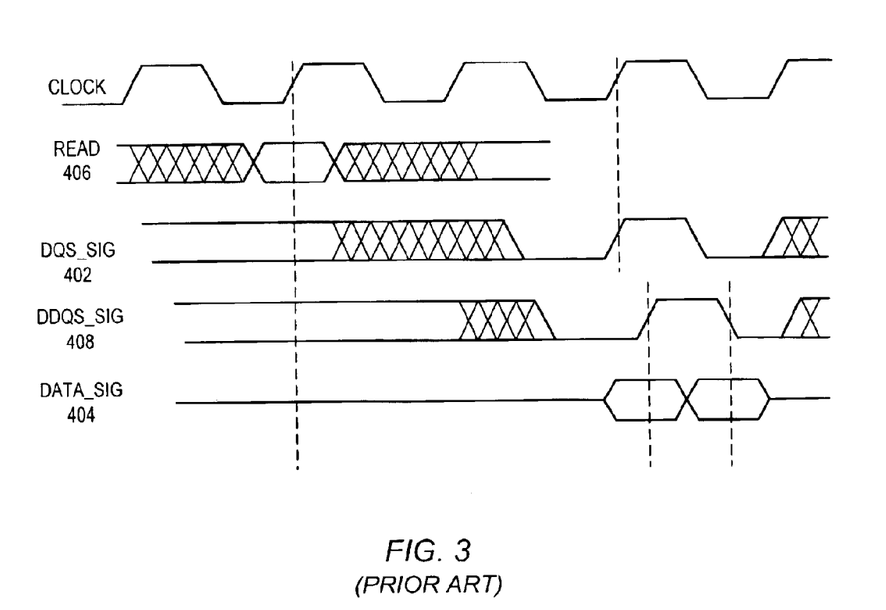
FIG. 3 illustrates a timing relationship between a read signal, a DQS signal, a delayed version of the DQS signal, and a data bus signal during a DDR SDRAM read operation in accordance with prior art.

According to prior art, a read operation for a DDR SDRAM may be performed as follows. A host system, which may be an ASIC that may include a DDR SDRAM controller and an interface unit, sends out a single Read request. The DDR SDRAM receives the Read request through a set of control signals. A predetermined number of clock cycles after having received the Read request, the DDR SDRAM sends a predetermined number of consecutive DQS signal pulses back to the host system. The predetermined number of clock cycles may be referred to as "CAS latency", where CAS stands for "Column Address Strobe". The number of consecutive DQS signal pulses may be commensurate with one half the value of a predetermined burst length for the read operation. The DDR SDRAM also sends a predetermined number of sets of data to the host system, where the predetermined number may be commensurate with the value of the predetermined burst length for the read operation. A timing relationship between a Read request (READ) 406, a DQS signal (DQS_SIG) 402, the DQS signal delayed by a quarter clock cycle (DDQS_SIG) 408 and data signal (DATA_SIG) 404 for the read operation is shown in FIG. 3, wherein for the purposes of illustration the burst length and the CAS latency have both been assigned a value of two.

Figure 4:
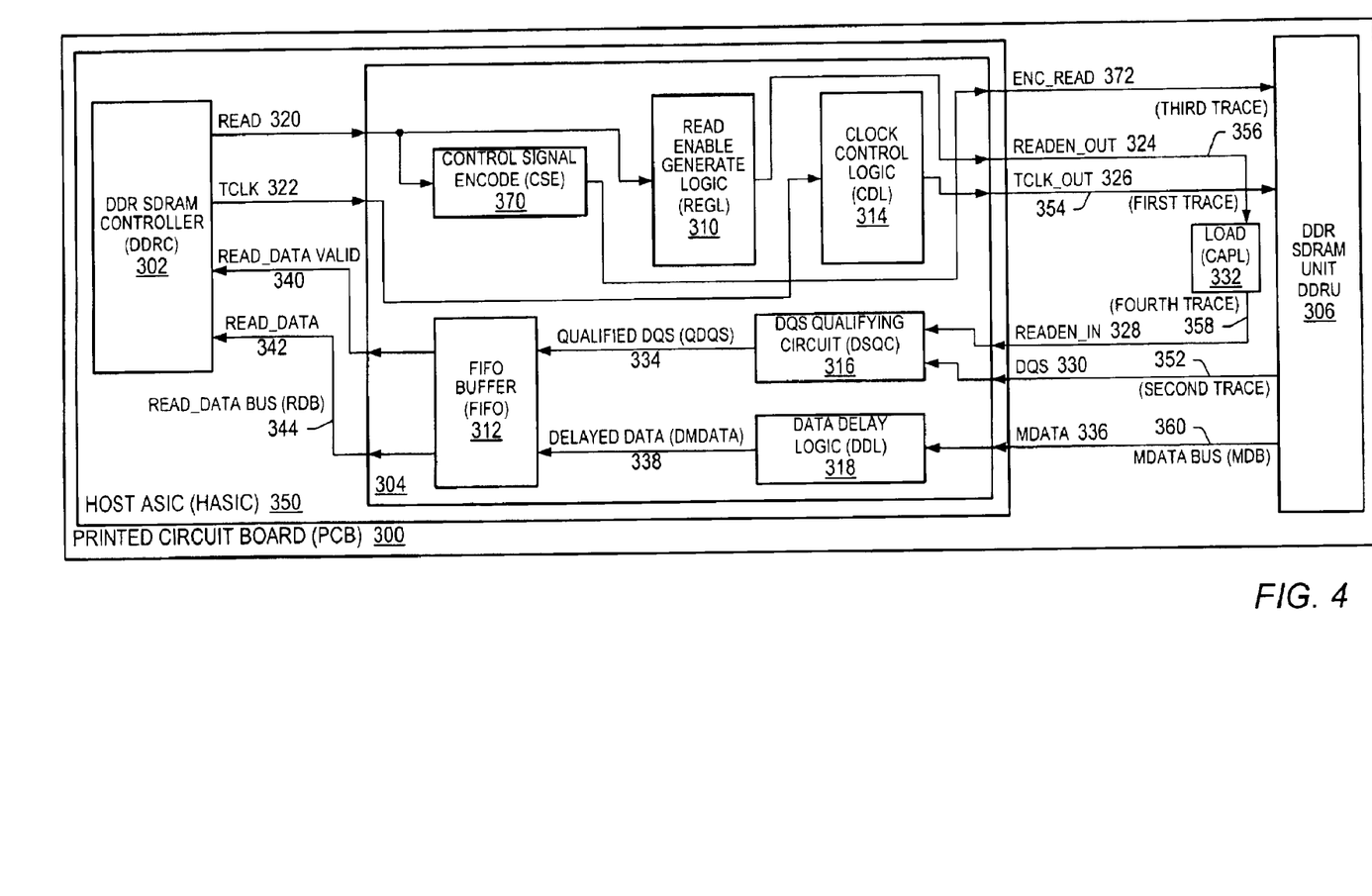
FIG. 4 illustrates an improved DDR SDRAM system with an improved interface unit, implemented in accordance with one set of embodiments of the present invention.

FIG. 4 illustrates part of a DDR SDRAM system implemented in accordance with one set of embodiments of the present invention. In this set of embodiments a DDR SDRAM Controller (DDRC) 302, an Interface unit (IU) 304, and a DDR SDRAM unit (DDRU) 306 are configured on a printed circuit board (PCB) 300, and DDRC 302 is coupled to DDRU 306 through IU 304. A Read signal 320 generated by DDRC 302 is connected to IU 304, and a DQS signal 330 generated by DDRU 306 is also connected to IU 304. A Memory Data Bus (MDB) 360 carrying Memory Data (MDATA) 336 from DDRU 306 is also coupled to IU 304. A clock signal (TCLK) 322 provided by DDRC 302 is connected to IU 304.

DDRC 302 may be a part of a Host ASIC (HASIC) 350. IU 304 may also be embedded on HASIC 350. In one embodiment, IU 304 contains a Read Enable Generate Logic block (REGL) 310, a Control Signal Encode block (CSE) 370, a Clock Control Logic block (CCL) 314, a First-In First-Out buffer (FIFO) 312, a DQS Signal Qualifying Circuit (DSQC) 316 and a Data Delay Logic (DDL) 318 block. Read signal 320 may be connected to CSE 370 to generate an encoded version of Read signal 320 (ENC_READ) 372, which may be directly routed to DDRU 306 from IU 304. Furthermore, Read signal 320 may be connected to and used by REGL 310 to generate a Read Enable Output signal (READEN_OUT) 324. In one embodiment, TCLK 322 is connected to and used by CCL 314 to generate an output clock signal (TCLK_OUT) 326 that is used as a clock by DDRU 306. TCLK_OUT 326 is connected to DDRU 306 via a first trace 354 on PCB 300 and DQS 330 is connected to IU 304 via a second trace 352 on PCB 300. DDL 318 may operate on MDATA 336 resulting in DDL 318 generating a delayed version of MDATA 336 (DMDATA) 338.

Figure 6:
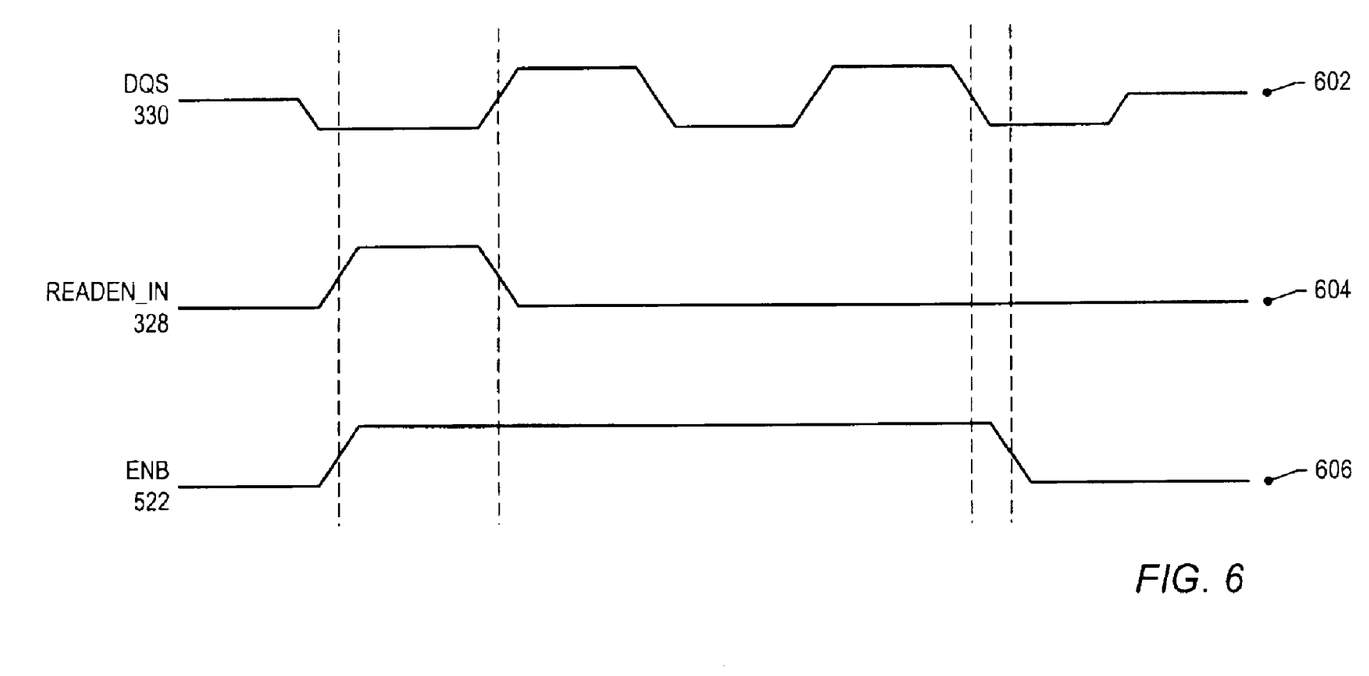
FIG. 6 illustrates a timing relationship between input and output signals of an embodiment of a DQS qualifying circuit.

In one set of embodiments a third trace 356 is laid down on PCB 300 running parallel and near to first trace 354 and a fourth trace 358 is laid down on PCB 300 running parallel and near to second trace 352. In particular, third trace 356 may run from IU 304 to a point in close proximity to DDRU 306 without actually being connected to DDRU 306. Furthermore, fourth trace 358 may run from a point in close proximity to DDRU 306 without actually being connected to DDRU 306, to IU 304. Third trace 356 and fourth trace 358 may be coupled through a capacitive load (CAPL) 332. CAPL 332 may match a pin loading incurred by TCLK_OUT 326 at DDRU 306. READEN_OUT 324 leaves IU 304 via third trace 356 and a Read Enable Input signal (READEN_IN) 328 is returned to IU 304 via fourth trace 358. Any delay experienced by TCLK_OUT 326 traveling on first trace 354 from IU 304 to DDRU 306 is substantially matched by a delay experienced by READEN_OUT 324 traveling on third trace 356 from IU 304 to CAPL 332. Similarly, any delay experienced by DQS 330 traveling on second trace 352 from DDRU 306 to IU 304 is substantially matched by a delay experienced by READEN_IN 328 traveling on fourth trace 358 from CAPL 332 to IU 304. The matching delays provide for a timing relationship between READEN_IN 328 and DQS 330 to remain substantially unchanged, regardless of variations in delay due to process, voltage and temperature. The timing relationship is shown in FIG. 6, illustrated by a READEN_IN 328 pulse and a first of one or more DQS 330 pulses. As shown in FIG. 6, a READEN_IN 328 pulse may precede a first of one or more DQS 330 pulses by one-half of a clock cycle, wherein the clock cycle is a cycle of TCLK_OUT 326.

DSQC 316 may use READEN_IN 328 and DQS 330 to generate a qualified DQS signal (QDQS) 334. In one embodiment, FIFO 312 uses QDQS 334 to sample and latch DMDATA 338. As a result of DDL 318 having operated on MDATA 336, a timing relationship between DMDATA 338 and QDQS 334 closely matches the nominal timing relationship illustrated in FIG. 3 between DATA_SIG 404 and DDQS_SIG 408, respectively. The nominal timing relationship may be required in order to successfully latch DMDATA 338. FIFO 312 may be coupled to DDRC 302 via a Read-Data Valid (RDV) 340 signal and a Read-Data Bus (RDB) 344 carrying Read-Data (RDATA) 342 to DDRC 302. DDRC 302 may use RDV 340 to qualify RDATA for HASIC 350.

Figure 5A:
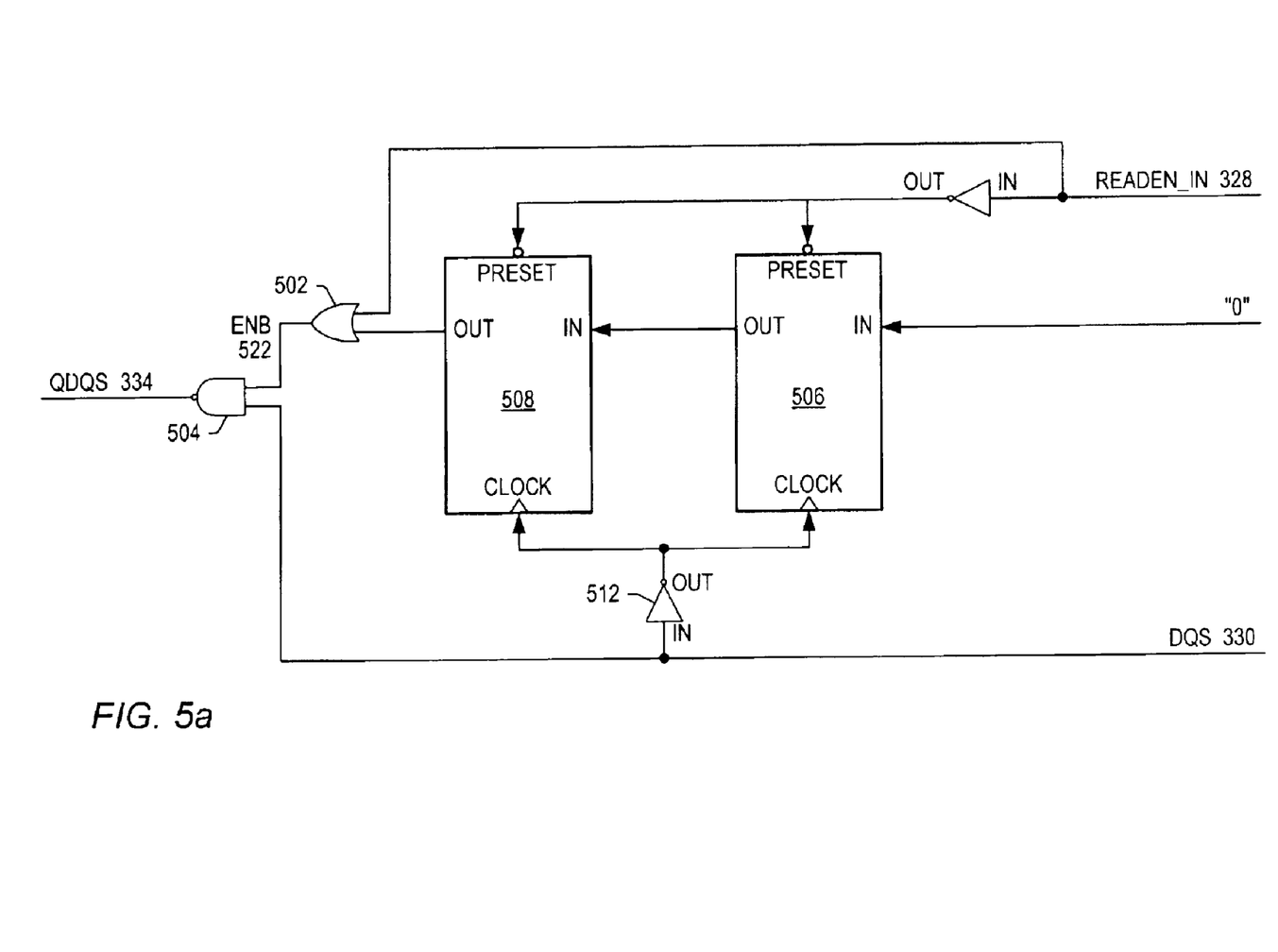
FIG. 5a illustrates one embodiment of a DQS signal qualifying circuit that supports read operations for a burst length of four.

One implementation of DSQC 316 for supporting read operations with a burst length of four is illustrated in FIG. 5a. In this implementation, READ_EN 328 is used for generating an enable signal (ENB) 522 that is coupled to one input of a NAND gate (NAND) 504 with DQS 330 coupled to another input of NAND 504, where the output of NAND 504 is QDQS 334. A two-stage shift register is implemented by connecting two rising-edge triggered flip-flops (DFF) 506 and DFF 508 in a series, with an input of DFF 506 tied to a logic low level and READEN_IN 328 coupled to an active low preset input of DFF 506 and an active low preset input of DFF 508 through an inverter (UV) 510, where READEN_IN 328 is connected to the input of INV 510 and the output of INV 510 is connected to the active low preset input of DFF 506 and to the active low preset input of DFF 508. An output of DFF 508 is connected to an input of an OR gate (OR) 502 and READEN_IN 328 is connected to another input of OR 502, where the output of OR 502 is ENB 522. DQS 330 is connected to the input of an inverter (INV) 512 with the output of INV 512 connected to a clock input of DFF 506 and to a clock input of DFF 508, resulting in both DFF 506 and DFF 508 being triggered by a trailing edge of a DQS 330 pulse.

A timing relationship between DQS 330, READEN_IN 328 and ENB 522 is shown in FIG. 6. As illustrated, a READEN_IN 328 pulse may arrive a half clock cycle before a first DQS 330 pulse. ENB 522 may remain asserted for the duration of all DQS 330 pulses. ENB 522 may not be asserted when DQS 330 resides in an invalid state. As a result, QDQS 334 may not reside in an invalid state and may otherwise mirror DQS 330.

Figure 5B:
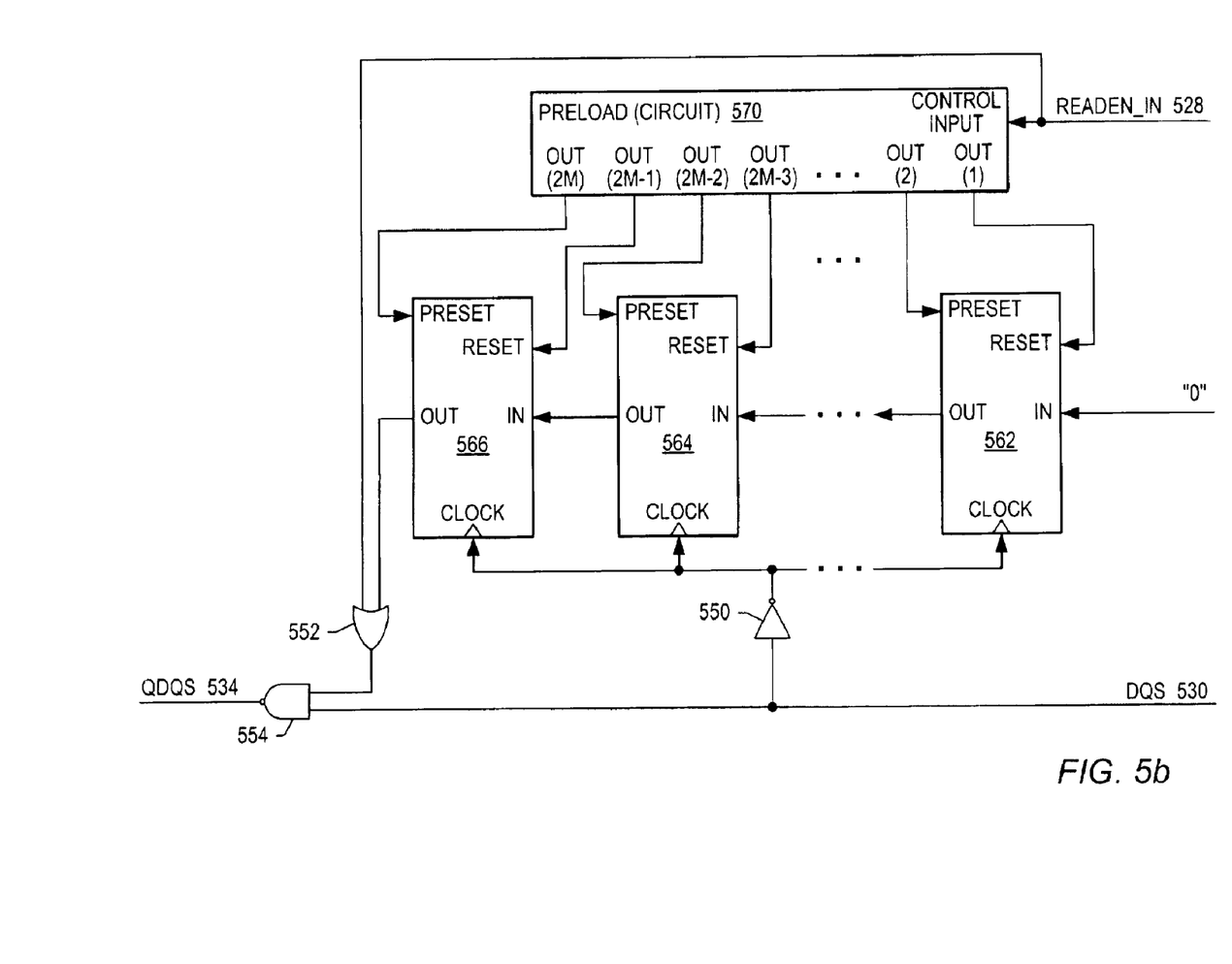
FIG. 5b illustrates one embodiment of a DQS signal qualifying circuit that supports read operations for multiple burst lengths.

More generally, for supporting a burst length of value 2*N, where N is a positive integer, N flip-flops may be connected in a series, creating an N-stage shift register. Furthermore, in support of active high preset inputs, IV 510 may be omitted and READEN_IN 328 may be directly connected to an active high preset input of each flip-flop of the series. FIG. 5b illustrates one implementation of DSQC 316 that supports any burst length of value 2*N less than or equal to 2*M, where N and M are both positive integers. In this implementation, M flip-flops, (FF) 562, . . . FF 564, FF 566, are connected in a series, creating an M-stage shift register, where FF 566 is the last flip-flop of the series, and a preload circuit 570 is configured and coupled to a preset input and a reset input of each flip-flop of the series, where READEN_IN 528 is coupled to an input of the preload circuit. Upon receiving a READEN_IN 528 pulse, the preload circuit may preset the last N flip-flops of the series, and reset the remaining flip-flops of the series. Similarly to the implementation shown in FIG. 5a, DQS 530 is coupled to a clock input of each flip-flop through an inverter (INV) 550, where the DQS 530 is connected to the input of INV 550 and the output of INV 550 is connected to the clock input of each flip-flop. READEN_IN 528 is coupled to an input of an OR gate (OR) 552 and an output of FF 566 is coupled to another input of OR 552, where the output of OR 552 is a resulting enable signal ENB 580 that is coupled to an input of a NAND gate (NAND) 554. DQS 530 is connected to another input of NAND 554 producing a qualified DQS signal (QDQS) 534 as the output of NAND 554. A timing relationship between DQS 530, READEN_IN 528 and ENB 580 substantially matches the timing relationship between DQS 330, READEN_IN 328 and ENB 522, respectively, as illustrated in FIG. 6.

Figure 7:
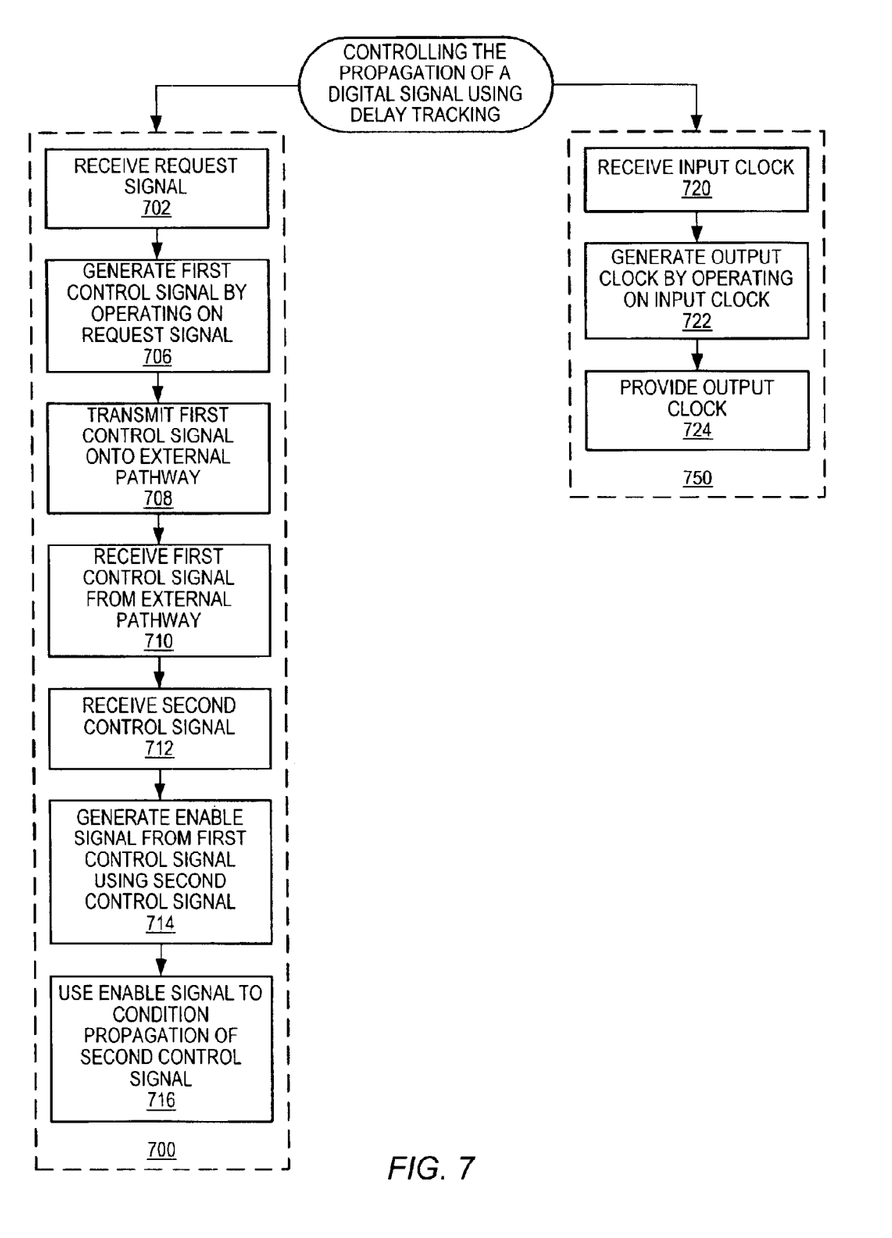
FIG. 7 illustrates part of a method for controlling the propagation of a digital signal using delay tracking, as pertaining to an interface unit configured on a printed circuit board.

A flowchart of a method for controlling the propagation of a digital signal using delay tracking, as pertaining to an interface unit, is shown in FIG. 7. The method is discussed for a simple system comprised of a controller coupled to a controlled unit through the interface unit, the system configured on a printed circuit board. The method comprises two sets of events (700 and 750), which may take place concurrently.

The set of events 750 describes the providing of an output clock by the interface unit, based on an input clock received by the interface unit. The interface unit receives the input clock (720) and generates the output clock by operating on the input clock (722). The output clock is then provided as an output of the interface unit (724). In one embodiment, generation of the output clock 722 may comprise operations that result in the output clock being a synchronized version of the input clock, such that the output clock and a set of output signals provided by the interface unit are all synchronized. The synchronization may be achieved using a separate clock signal that may have twice the frequency of the input clock and may also be an input to the interface unit. The input clock may be provided to the interface unit by the controller.

The set of events 700 describes the generating of an enable signal that may be used to qualify a trigger signal, and thus control its propagation. The interface unit receives a request signal (702) and generates a first control signal by operating on the request signal (706). In one embodiment the request signal is provided to the interface unit by the controller. The first control signal is sent to an external pathway (708) through what may be a first control signal output port of the interface unit. The external pathway may be routed from the output port to what may be a first control signal input port of the interface unit, where the first control signal is received by the interface unit (710), after the first control signal has traversed the external pathway. The interface unit also receives a second control signal (712). A delay may be incurred by the first control signal while traversing the external pathway from the output port to the input port. The delay may match a time period that is defined as starting with a sending of a pulse of the output clock by the interface unit, and ending with a receiving of a pulse of the second control signal by the interface unit, where the pulse of the second control signal is received prior to the interface unit sending a next pulse of the output clock.

In 708, a pulse of the first control signal is sent substantially coincident with either a sending of a pulse of the output clock, or a point in time that occurs one-half cycle of the output clock following a sending of a pulse of the output clock. In one embodiment, the second control signal is generated by the controlled unit, which sends a series of one or more pulses of the second control signal in response to the controlled unit having received either a pulse of the request signal or a pulse of an encoded version of the request signal, where the series of one or more pulses reach the interface unit in 712. In this embodiment, a pulse of the first control signal in 710 reaches the interface unit one-half cycle of the output clock before a first pulse of the series of one or more pulses of the second control signal reaches the interface unit.

The interface unit uses the second control signal to generate an enable signal from the first control signal (714), and uses the enable signal to conditionally propagate the second control signal (716).

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

What is claimed is:

1. A system comprising:
    a printed circuit board, wherein configured on the printed circuit board is:
    a memory controller;
    a memory unit; and
    an interface unit, wherein the memory controller is coupled to the memory unit through the interface unit;
    wherein the interface unit is configured to receive an input clock and a read signal from the memory controller and a trigger signal from the memory unit;
    wherein the interface unit is further configured to generate an enable signal based on the read signal and to conditionally propagate the trigger signal based on the enable signal;
    wherein the interface unit includes a qualifying circuit, the qualifying circuit comprising:
    a first logic gate;
    a second logic gate; and
    a set of flip-flops coupled in a series;
    wherein an output of the first logic gate is the enable signal and is coupled to an input of the second logic gate;
    wherein an output of a last flip-flop of the series is coupled to an input of the first logic gate;
    wherein an input of a first flip-flop of the series is coupled to a constant value;
    wherein a delayed version of the read signal is coupled to a preset input of each flip-flop of the series;
    wherein another input of the first logic gate is configured to receive the delayed version of the read signal;
    wherein a clock input of each flip-flop of the series is configured to receive the trigger signal so as to induce triggering of each flip-flop on the trailing edge of each pulse of the trigger signal; and
    wherein another input of the second logic gate is configured to receive the trigger signal.

2. The system of claim 1, wherein the series of flip-flops consists of two D-flip-flops, wherein one of the two D-flip-flops is the first flip-flop of the series and the other D-flip-flop is the last flip-flop of the series.

3. The system of claim 1, wherein the first logic gate is a two-input OR gate and the second logic gate is a two-input NAND gate.

4. The system of claim 1, wherein the constant value is a logical zero.

5. The system of claim 1, wherein the enable signal is asserted after the trigger signal has transitioned to a valid state, and before the arrival of a first pulse of the trigger signal.

6. The system of claim 5, wherein the trigger signal is a DQS signal generated by a DDR memory unit.

7. The system of claim 6, wherein the DQS signal is coupled to the clock input of each flip-flop of the series through an inverter.

8. The system of claim 1, wherein the preset input of each flip-flop of the series is an active low input.

9. The system of claim 8, wherein the enable signal is coupled to the preset input of each flip-flop of the series through an inverter.

10. A method comprising:
    an interface unit receiving an input clock and a request signal from a controller device and a trigger signal from a controlled device;
    the interface unit generating an output clock by operating on the input clock;

the interface unit providing the output clock as an output, wherein the controlled device uses the output clock as its system clock;

the interface unit generating an enable signal based on the request signal and conditionally propagating the trigger signal based on the enable signal;

wherein said generating the enable signal comprises:

the interface unit generating a first control signal by operating on the request signal;

the interface unit transmitting the first control signal onto a pathway external to the interface unit and receiving the first control signal from the pathway, wherein the first control signal, as received from the pathway, is the enable signal;

wherein a delay incurred on the pathway matches a delay between a sending of a pulse of the output clock by the interface unit, and a receiving of a pulse of the trigger signal by the interface unit, said receiving of the pulse of the trigger signal occurring prior to the interface unit sending a next pulse of the output clock;

wherein in said transmitting the first control signal, a pulse of the first control signal is sent substantially coincident with either a sending of a pulse of the output clock or a point in time that occurs one-half of a clock cycle after a sending of a pulse of the output clock, wherein the clock cycle is a cycle of the output clock; and wherein the interface unit, the controller device and the controlled device are configured on a common printed circuit board, wherein the controller device is coupled to the controlled device through the interface unit.

11. The method of claim 10, wherein comprising:

the interface unit generating an encoded version of the request signal.

12. The method of claim 11, wherein a sending of a first pulse of a series of one or more pulses of the trigger signal to the interface unit by the controlled device is in response to the controlled device receiving a pulse of the encoded version of the request signal.

13. The method of claim 12, wherein a delay between the sending of the pulse of the encoded version of the request signal and the sending of the first pulse of the trigger signal corresponds to a predetermined number of clock cycles;

wherein in said receiving the first control signal and in said receiving the trigger signal, the first pulse of the trigger signal reaches the interface unit one-half of the clock cycle after the pulse of the first control signal reaches the interface unit.

14. The method of claim 11, wherein comprising:

the interface unit providing the request signal to the controlled device;

wherein a sending of a first pulse of a series of one or more pulses of the trigger signal to the interface unit by the controlled device is in response to the controlled device receiving a pulse of the request signal.

15. The method of claim 14, wherein a delay between the sending of the pulse of the request signal and the sending of the first pulse of the trigger signal corresponds to a predetermined number of clock cycles;

wherein, in said receiving the first control signal and in said receiving the trigger signal, the first pulse of the trigger signal reaches the interface unit one-half of the clock cycle after the pulse of the first control signal reaches the interface unit.

16. The method of claim 10, wherein comprising the interface unit latching data into a buffer using the conditionally propagated trigger signal.

17. A system comprising:

a printed circuit board, including: a memory controller, a memory unit, and an interface unit, wherein the memory controller is coupled to the memory unit through the interface unit;

wherein the interface unit is configured to:

receive an input clock and a read signal from the memory controller;

receive a trigger signal from the memory unit;

generate an enable signal based on the read signal;

conditionally propagate the trigger signal based on the enable signal;

generate an output clock by operating on the input clock; and provide the output clock as an output, wherein the memory unit uses the output clock as its system clock;

wherein to generate the enable signal the interface unit is configured to:

generate a first control signal by operating on the request signal;

transmit the first control signal onto a pathway external to the interface unit; and receive the first control signal from the pathway, wherein the first control signal, as received from the pathway, is the enable signal;

wherein a delay incurred on the pathway matches delay between a sending of a pulse of the output clock by the interface unit, and a receiving of a pulse of the trigger signal by the interface unit, said receiving of the pulse of the trigger signal occurring prior to the interface unit sending a next pulse of the output clock; and wherein in said transmit the first control signal, a pulse of the first control signal is sent substantially coincident with either a sending of a pulse of the output clock or a point in time that occurs one-half of a clock cycle after a sending of a pulse of the output clock, and wherein the clock cycle is a cycle of the output clock.

18. The system of claim 17, wherein the interface unit is embedded in the same integrated circuit as the memory controller.

19. The system of claim 17, wherein the memory unit is a double data-rate synchronous dynamic random access memory (DDR SDRAM);

wherein the trigger signal is a DQS signal generated by the DDR SDRAM.

20. The system of claim 17, wherein the interface unit is further configured to provide an output clock based on the input clock to the memory unit, wherein the output clock is routed from the interface unit to the memory unit through a first trace route on the printed circuit board.

21. The system of claim 20, wherein the interface unit is further configured to generate an encoded version of the read signal, and wherein the memory unit is configured to receive one or more of the following:

the read signal from the memory controller; and the encoded version of the read signal from the interface unit.

22. The system of claim 21, wherein the memory unit is further configured to generate one or more pulses of the trigger signal in response to one or more of the following:

the memory unit receiving a pulse of the read signal; and the memory unit receiving a pulse of the encoded read signal, wherein the trigger signal is routed from the memory unit to the interface unit through a second trace route on the printed circuit board.

23. The system of claim 17, wherein the interface unit is configured to generate the enable signal by performing one or more of:
- delaying the read signal by a predetermined latency;
- sending the delayed read signal through the pathway;
- receiving the delayed read signal from the pathway; and
- operating on the received delayed read signal to obtain the enable signal.

24. The system of claim 23, wherein said sending the delayed read signal, a pulse of the delayed read signal is sent substantially coincident with a sending of a pulse of the output clock.

25. The system of claim 23, wherein in said sending the delayed read signal, a pulse of the delayed read signal is sent substantially coincident with a point in time that occurs one-half of a clock cycle after a sending of a pulse of the output clock;
wherein the clock cycle is a cycle of the output clock.

26. The system of claim 17, wherein the pathway is on the printed circuit board and comprises;
- a first path segment running from the interface unit and in parallel to a first trace route; and
- a second path segment running to the interface unit and in parallel to a second trace route.

27. The system of claim 26, wherein the first path segment runs in close proximity to the first trace route and the second path segment runs in close proximity to the second trace route.

28. The system of claim 26, wherein the first path segment runs to a point in close proximity to the memory unit, and the second path segment runs from a point in close proximity to the memory unit.

29. The system of claim 17, wherein the external pathway is on the printed circuit board and comprises a capacitive load.

30. The system of claim 29, wherein the capacitive load matches a pin loading of the memory unit.

31. The system of claim 17, wherein the interface unit is further configured to latch into a buffer a set of data originating from the memory unit, using the conditionally propagated trigger signal.

32. The system of claim 17, wherein the interface unit includes a qualifying circuit, the qualifying circuit comprising:
- a first logic gate, a second logic gate, and a set of flip-flops coupled in a series, wherein an output of the first logic gate is the enable signal and is coupled to an input of the second logic gate;
- wherein an output of a last flip-flop of the series is coupled to an input of the first logic gate;
- wherein an input of a first flip-flop of the series is coupled to a constant value;
- wherein a delayed version of the read signal is coupled to a preset input of each flip-flop of the series;
- wherein another input of the first logic gate is configured to receive the delayed version of the read signal;
- wherein a clock input of each flip-flop of the series is configured to receive the trigger signal so as to induce triggering of each flip-flop on the trailing edge of each pulse of the trigger signal; and
- wherein another input of the second logic gate is configured to receive the trigger signal.

* * * * *

UNITED STATES PATENT AND TRADEMARK OFFICE
CERTIFICATE OF CORRECTION

PATENT NO. : 6,957,399 B2
DATED : October 18, 2005
INVENTOR(S) : Brian D. Emberling and Anthony S. Ramirez It is certified that error appears in the above-identified patent and that said Letters Patent is hereby corrected as shown below:

Column 9,
Line 32, delete "claim 10, wherein comprising:" and substitute -- claim 10, further comprising: --.

Signed and Sealed this

Third Day of January, 2006

JON W. DUDAS
*Director of the United States Patent and Trademark Office*